United States Patent
Bishop

(10) Patent No.: US 8,943,656 B2
(45) Date of Patent: Feb. 3, 2015

(54) SAFETY CONNECTOR

(75) Inventor: Jeffrey C. Bishop, Derby (GB)

(73) Assignee: Rolls-Royce PLC, London (GB)

( * ) Notice: Subject to any disclaimer, the term of this patent is extended or adjusted under 35 U.S.C. 154(b) by 83 days.

(21) Appl. No.: 13/364,690

(22) Filed: Feb. 2, 2012

(65) Prior Publication Data

US 2012/0222274 A1    Sep. 6, 2012

(30) Foreign Application Priority Data

Mar. 2, 2011    (GB) .................................. 1103518.5

(51) Int. Cl.
*F16B 1/00* (2006.01)
*F16B 2/18* (2006.01)

(52) U.S. Cl.
CPC .. *F16B 2/18* (2013.01); *Y10S 24/44* (2013.01); *Y10S 24/45* (2013.01); *Y10S 24/46* (2013.01)
USPC ....... 24/593.11; 24/657; 24/664; 24/DIG. 44; 24/DIG. 45; 24/DIG. 46

(58) Field of Classification Search
USPC ......... 403/221, 229, 364, 367, 366, 368, 369, 403/371, 372, 373, 228; 267/134, 135, 182; 188/382, 129, 268; 24/657, 664, 587.1, 24/593.11, DIG. 41, DIG. 45, DIG. 44, 24/DIG. 36; 411/500, 508, 510
See application file for complete search history.

(56) References Cited

U.S. PATENT DOCUMENTS

| | | | | |
|---|---|---|---|---|
| 2,495,667 A | * | 1/1950 | Vizner | ......................... 24/593.1 |
| 3,741,514 A | * | 6/1973 | Snurr | ............................ 248/412 |
| 6,345,946 B1 | | 2/2002 | Mainini et al. | |

FOREIGN PATENT DOCUMENTS

| | | |
|---|---|---|
| EP | 1 213 489 A1 | 6/2002 |
| WO | WO2004/067975 A2 | 8/2004 |

OTHER PUBLICATIONS

Jul. 22, 2013 Search Report issued in European Patent Application No. 12153698.
Jun. 29, 2011 Search Report issued in Great Britain Patent Application No. 1103518.5.

* cited by examiner

*Primary Examiner* — Jack W Lavinder
(74) *Attorney, Agent, or Firm* — Oliff PLC

(57) ABSTRACT

A safety connector (2) comprising: a first member (4) and a second member (6) movably coupled to one another; wherein the first and/or second members (4, 6) comprise a retention mechanism (14a, 14b, 16); wherein the retention mechanism (14a, 14b, 16) has a first configuration which prevents relative movement between the first and second members (4, 6) and a second configuration which allows relative movement between the first and second members (4, 6); and wherein the retention mechanism (14a, 14b, 16) changes from the first configuration to the second configuration when a force between the first and second members (4, 6) exceeds a predetermined threshold force.

9 Claims, 2 Drawing Sheets

SAFETY CONNECTOR

The present invention relates to a safety connector and particularly, but not exclusively, to a connector which can connect two components whilst isolating each component from movement of the other component.

BACKGROUND

In the event of the whole or a part of a fan blade becoming detached from a fan of a gas turbine engine, it is necessary for the casing around the fan (the fan case) to contain the ejected blade in order to prevent further damage to other engines and the fuselage of the aircraft. Such a blade-off event, and particularly the containment of the blade by the fan case, can create a travelling wave to form around the fan case periphery.

A gas turbine engine typically has a number of pieces of ancillary equipment attached to the fan case. The travelling wave which may occur in a blade-off event, as described above, will interact with and disturb any such components which lie within the amplitude of its path. This may generate abnormally high forces and accelerations which can cause the component and/or mounting point of the component to the fan-case to fail. Where the mounting point of the component to the fan case fails, this may also cause damage to the other engines and the fuselage of the aircraft.

In general terms, the magnitude of the force placed on the mounting point can be characterised by the intimacy of the wave to the component and the mass of the component. For normal conditions, the maximum strength required at a mounting point for safe and continuous engine-running can be gained from test data and/or theoretical modelling.

Where it is not possible to prevent failure at the mounting point, it may be possible to retain the component following failure of the mounting point using a wire lanyard. The wire lanyard may be sufficiently strong to prevent the component from being ejected from the engine. However, such a wire lanyard allows uncontrolled free movement of the component, and, when subjected to the out-of-balance forces which ensue following a blade-off event, this can result in failure of the component. Clearly, this is undesirable where the component provides a critical function in the flight of the aircraft.

Alternatively, a 'catcher-bracket' may be used to 'catch' such ancillary equipment if a catastrophic event causes failure of the mounting point to the fan case. Such catcher-brackets remain load and stress-free during normal use and are only responsible for retaining the ancillary equipment if the working bracket or structure fails.

However, catcher-brackets require precise and accurate setup to ensure that they are positioned an appropriate distance from the component. If this is not the case, the catcher bracket may be exposed to unwanted intermittent loading where the distance is too small, and may not perform its function where the distance is too large.

Furthermore, whilst wire lanyards and catcher brackets mitigate the effects of the failure of a mounting point, they do not prevent the failure from occurring. Consequently, it is still necessary to replace the mounting bracket or structure.

The present invention seeks to provide a safety connector which overcomes some or all of the problems associated with the prior art devices described above.

STATEMENTS OF INVENTION

In accordance with an aspect of the invention there is provided a safety connector comprising: a first member and a second member movably coupled to one another; wherein the first and/or second members comprise a retention mechanism; wherein the retention mechanism has a first configuration which prevents relative movement between the first and second members and a second configuration which allows relative movement between the first and second members; and wherein the retention mechanism changes from the first configuration to the second configuration when a force between the first and second members exceeds a predetermined threshold force; and wherein the retention mechanism comprises a biasing arrangement which biases a part of the retention mechanism towards the first configuration, the biasing arrangement comprising a plurality of beam-springs; and wherein the first and second members comprise complementary features which interlock in the first configuration; and wherein the first member comprises a plurality of indentations and the second member comprises a plurality of protrusions, which interlock with one another, each of the indentations being defined b a forward facing surface and a rearward facing surface, each of the protrusions being defined by a forward facing surface and a rearward facing surface; and wherein each of the protrusions interlock with a corresponding one of the indentations, with the forward facing surfaces of the protrusions contacting the rearward facing surfaces of the indentations, and the rearward facing surfaces of the protrusions contacting the forward facing surfaces of the indentations.

The safety connector of the present invention may be used to connect two components whilst isolating each of the two components from movement of the other component. Accordingly, the safety connector may prevent damage to either or both of the components. The predetermined threshold force may be selected to provide desired characteristics for the safety connector. These characteristics may be determined by the application in which the safety connector is to be used.

The first and second members may be translatably coupled to one another.

The first and second members may be rotatably coupled to another.

The first and second members may be coupled so as to allow movement in two directions.

The first member may comprise a body portion having a cavity therein for receiving the second member.

The retention mechanism may be operable to dampen movement between the first and second members.

The biasing arrangement may at least in part determine the predetermined threshold force.

The or each indentation and protrusion may have a pair of surfaces which define the indentation or protrusion, and the angle of these surfaces may be selected to determine the predetermined threshold force.

The first and/or second members may comprise one or more displacement stops which limit the range of movement of the first and second members.

The first and second members may be connected to or integrally formed with first and second components respectively, and the safety connector may isolate the first component from movement of the second component and vice versa.

The first component may be a fan-case of a gas turbine engine and the second component may be an ancillary component of the engine which is attached to the fan case.

The first component may be a car chassis and the second component may be a bumper.

The first component may be a hook of a lift system and the second component may be a hoist of the lift system.

The predetermined threshold force may be configured to be substantially equal to the Safe Working Load of the lift system.

A visual indication or alarm may be triggered when the retention mechanism changes from the first configuration to the second configuration.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION

Figure 1:
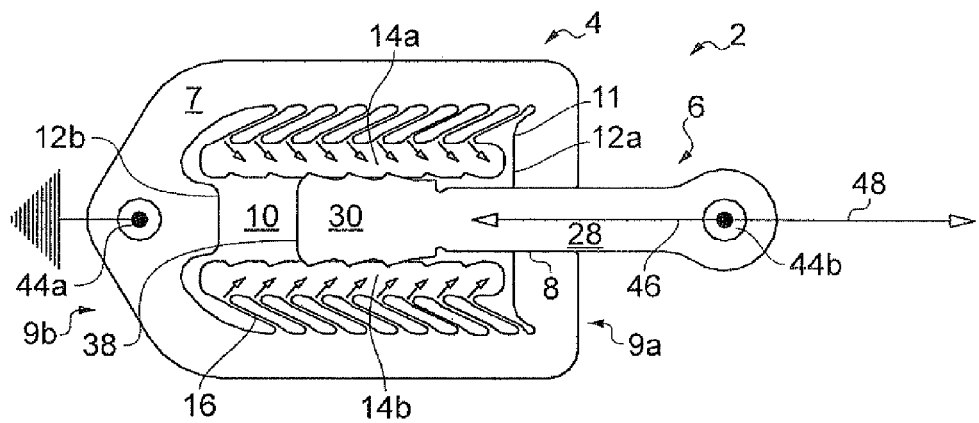
FIG. 1 is a cross-sectional view of an embodiment of a safety connector in an engaged configuration.

With reference to FIG. 1, a safety connector 2 according to an embodiment of the invention comprises a first member 4 and a second member 6 which are movably coupled to one another.

The first member 4 comprises a generally cuboid-shaped body portion 7. The body portion 7 has an opening 8 at a first end 9a which passes through the body portion 7 and into a cavity 10 inside the first member 4. An inner wall 11 of the cavity 10 provides a displacement stop 12a at the first end 9a and a displacement stop 12b at a second end 9b of the cavity 10.

A retention mechanism is provided within the cavity 10. The retention mechanism comprises a first elongate retaining portion 14a and a second elongate retaining portion 14b. Each of the first and second retaining portions 14a, 14b extends parallel with a longitudinal axis of the body portion from the displacement stop 12a towards the displacement stop 12b at the second end 9b of the cavity 10. The first and second retaining portions 14a, 14b are spaced away from one another to define a passageway therebetween.

Each of the first and second retaining portions 14a, 14b are connected to the body portion 7 by a plurality of beam springs 16. The beam springs 16 are flat strips of resilient material, which connect at one end to the body portion 7 and at the other end to the first or second retaining portion 14a, 14b. The first and second retaining portions 14a, 14b are free to move relative to the body portion 7. The beam springs 16 are configured so that, at rest (i.e. with no applied force), the beam springs are inclined towards a direction substantially perpendicular to the first and second retaining portions 14a, 14b and the body portion 7. That is to say the first and second retaining portions are displaced away from the opening 8 so that the beam springs 16 are angled towards the displacement stop 12b at the second end 9b of the cavity 10. For example, the beam springs will lie at an angle of substantially about 30 to 45 degrees to a direction perpendicular to the first and second retaining portions 14a, 14b and the body portion 7. The beam springs 16 bias the first and second retaining portions 14a, 14b in a direction which has a component that acts to force the first and second retaining portions 14a, 14b towards the opening 8 of the body portion 7 and a component that acts to force the first and second retaining portions 14a, 14b toward one another.

Figure 2:
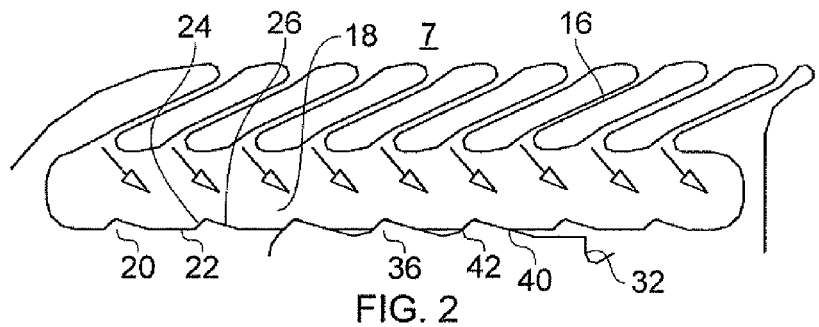
FIG. 2 is an enlarged view of a portion of the safety connector.

As shown particularly in FIG. 2, each of the first and second retaining portions 14a, 14b comprises an inward facing surface 18 which opposes the other of the first and second retaining portions 14a, 14b. Each of the inward facing surfaces 18 comprise a plurality of indentations 20 spaced along the inward facing surface 18. The indentations 20 are separated from one another by planar regions 22. Each of the indentations 20 is defined by a forward facing surface 24 which is angled towards the opening 8 at the first end 9a of the body portion 7 and a rearward facing surface 26 which is angled towards the displacement stop 12b at the second end 9b of the body portion 7.

The second member 6 is an elongate member which comprises a rod portion 28 and a head portion 30 coupled to an end of the rod portion 28. The head portion 30 is slightly wider than the rod portion 28 and has a pair of shoulders 32 where the head portion 30 joins the rod portion 28. The head portion 30 has an end surface 38 at an opposite end to the rod portion 28. The head portion 30 comprises a first outward facing surface 34a and a second outward facing surface 34b. The first and second outward facing surfaces 34a, 34b each comprise a plurality of protrusions 36 which are spaced along the outward facing surfaces 34a, 34b and which form a saw-tooth arrangement. Each of the protrusions 36 is defined by a forward facing surface 40 which is angled towards a free end of the head portion 30 and a rearward facing surface 42 which is angled towards the rod portion 28 of the second member 6.

The first member 4 is provided with a through bore comprising an attachment point 44a and the second member 6 is provided with a through bore comprising an attachment point 44b. In use, the attachment point 44a of the first member 4 is connected to a piece of ancillary equipment (not shown), for example by means of a bolt, and the attachment point 44b of the second member 6 is connected to a fan case of a gas turbine engine (also not shown), for example by means of a bolt, or vice versa. The safety connector 2 therefore connects the ancillary equipment to the fan case.

In an assembled condition of the safety connector 2, the head portion 30 of the second member 6 is received into the cavity 10 of the first member 4 with the rod portion 28 extending through the opening 8. The head portion 30 is disposed between the first and second retaining portions 14a, 14b with the inward facing surfaces 18 of the first and second retaining portions 14a, 14b contacting the outward facing surfaces 34a, 34b of the head portion 30.

As described previously, the first and second retaining portions 14a, 14b are biased toward one another by virtue of the beam springs 16. The introduction of the head portion 30 between the first and second retaining portions 14a, 14b forces the first and second retaining portions 14a, 14b away from one another so as to place an additional load on the beam springs 16.

The protrusions 36 of the head portion 30 are complementary to the indentations 20 of the first and second retaining portions 14a, 14b. Accordingly, the protrusions 36 interlock with the indentations 20, with the forward facing surfaces 40 of the protrusions 36 contacting the rearward facing surfaces 26 of the indentations 20 and the rearward facing surfaces 42 of the protrusions 30 contacting the forward facing surfaces 24 of the indentations 20.

The beam springs 16 force the first and second retaining portions 14a, 14b toward one another and thus prevent the protrusions 36 of the head portion 30 being withdrawn from the indentations 20. In order to overcome the biasing force applied by the beam springs 16 it is necessary to exert a force between the first member 4 and the second member 6 which exceeds a predetermined threshold force. This force may act to push the head portion 30 inwards (i.e. towards the displacement stop 12b) or to pull the head portion 30 outwards (i.e. towards the displacement stop 12a), as shown by arrows 46 and 48 respectively. The predetermined threshold force is sufficient to overcome the biasing force and thus push the first and second retaining portions 14a, 14b away from one another.

Where the head portion 30 is forced inwards, the forward facing surfaces 24 of the indentations 20 ride up the rearward facing surfaces 42 of the protrusions 36. Alternatively, where the head portion 30 is forced outwards, the rearward facing surfaces 26 of the indentations 20 ride up the forward facing surfaces 40 of the protrusions 36. The angles of the protrusions 36 and indentations 20 are configured so as to provide substantially identical threshold forces for overcoming the biasing force in both the inward and outward directions 46, 48.

Once the protrusions 36 have been withdrawn from the indentations 20 they ride along the planar regions 22 of the inward facing surfaces 18 allowing relative movement between the first and second members 4, 6. The protrusions 36 may rest on the planar regions 22 without exerting any force between the first member 4 and the second member 6. Furthermore, the protrusions 36 may move over the planar regions 22 even if the exerted force is below the predetermined threshold force.

The second member 6 may be displaced so that each protrusion 36 moves to the next indentation 20 along the length of the inward facing surfaces 18. If the force is below the predetermined threshold force, the beam springs force the first and second retaining portions 14a, 14b towards one another so as to engage the protrusions 36 into the indentations 20. However, if the force is above the predetermined threshold force the retaining portions 14a, 14b are again forced away from one another allowing the protrusions 36 to continue to the next planar regions 22. This may continue until the shoulders 32 of the head portion contact the displacement stop 12a or the end surface 38 contacts the displacement stop 12b.

Accordingly, the safety connector 2 may be used to isolate the ancillary equipment from movement of the fan case, and vice versa.

Figure 3:
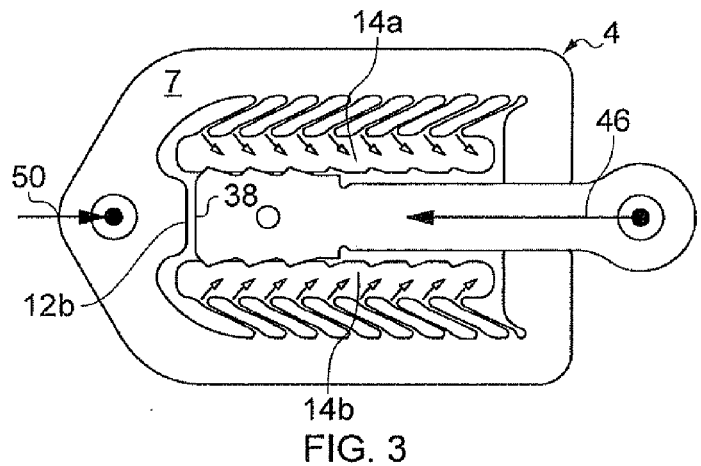
FIG. 3 is a cross-sectional view of the safety connector following an impact, wherein the safety connector is in an engaged configuration and is shown prior to a maximum displacement of the safety connector from its initial position.

As described previously, a blade-off event can create a travelling wave to form around the fan case periphery which can cause damage to any ancillary equipment connected to it. As shown in FIG. 3, the travelling wave initially causes the fan case to move outwards, as indicated by the arrow 46. The inertia of the ancillary equipment provides resistance to this force, as indicated by arrow 50, and therefore a force is exerted between the first member 4 and the second member 6. When this force exceeds the predetermined threshold force and therefore the first member 4 and second member 6 are displaced relative to one another, the head portion 30 moves further within the cavity 10 towards the displacement stop 12b. The displacement of the second member 6 requires work to be done in order to overcome the biasing force of the beam springs 16. Accordingly, the energy of the travelling wave is dissipated by the damping action of the safety connector 2. Preferably, the travelling wave reaches its maximum amplitude before the end surface 38 of the head portion 30 contacts the displacement stop 12b, as shown in FIG. 3.

After the travelling wave has reached its maximum amplitude, the fan case moves back towards its initial position, as indicated by arrow 48 in FIG. 3. Again, the inertia of the ancillary equipment provides resistance to this force, as indicated by arrow 52, and therefore a force is exerted between the first member 4 and the second member 6 which exceeds the predetermined threshold force. Consequently, the first member 4 and second member 6 are displaced relative to one another so that the head portion 30 is withdrawn from the cavity 10 towards the displacement stop 12a.

Figure 4:
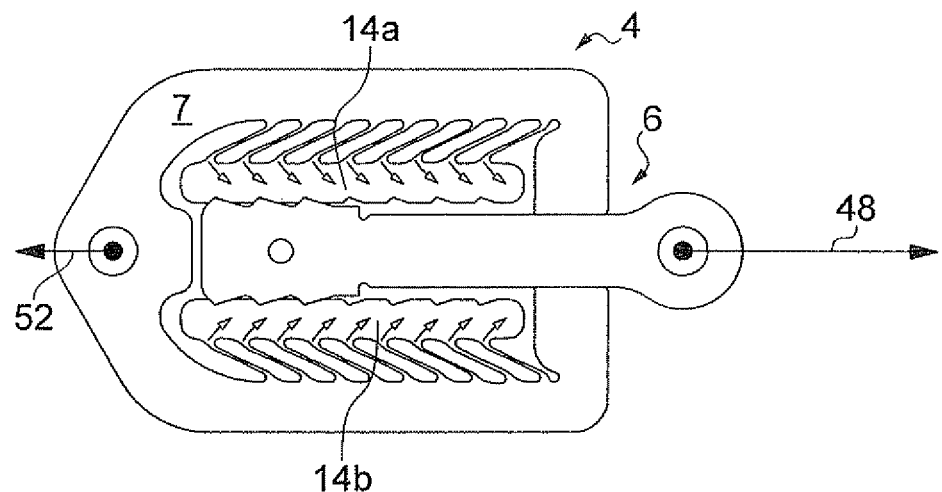
FIG. 4 is a cross-sectional view of the safety connector after the maximum displacement of the safety connector from its initial position.
Figure 5:
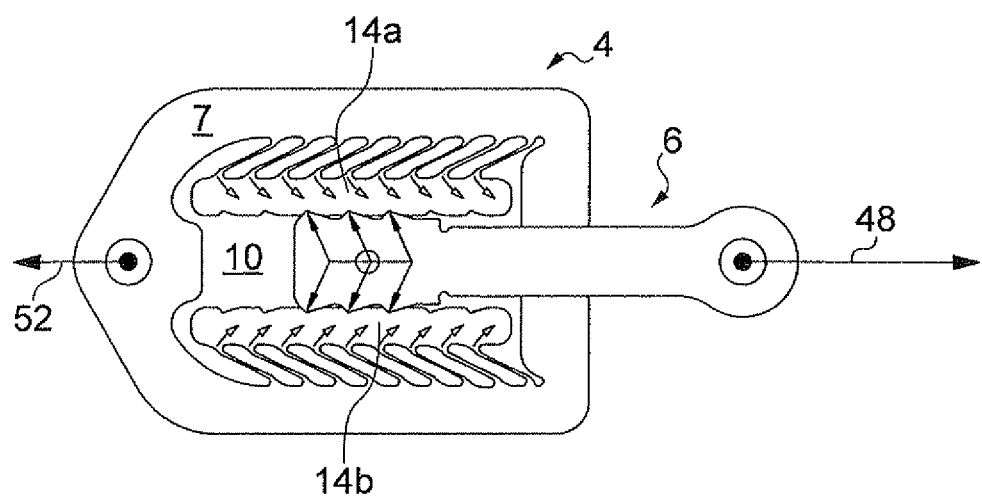
FIG. 5 is a cross-sectional view of the safety connector where the amplitude of the impact has decayed below a threshold force such that the safety connector is again in the engaged configuration.

This cycle is repeated until the travelling wave has decayed sufficiently so that the force between the first and second members 4, 6 is below the predetermined threshold force. As shown in FIG. 4, when the force is below this force the protrusions 36 engage with the indentations 20 so as to lock the first and second members 4, 6 to one another and to prevent relative movement between the first and second members 4, 6.

Although the embodiment described above employs beam springs 16 to bias the first and second retaining portions 14a, 14b, other biasing arrangements may be used. For example, the first and second retaining portions 14a, 14b may be biased using a plurality of compression springs located between the each of the first and second retaining portions 14a, 14b and the body portion 7. Further still, an elastomeric or hydraulic element or other resilient member may be located between each of the first and second retaining portions 14a, 14b and the body portion 7, or the first and second training portions 14a, 14b may be fixed in position, but sufficiently resilient to flex away from the first member 4 when the predetermined threshold force is exceeded.

The first and second members 4, 6 may be integrally formed with the fan case and the ancillary equipment rather than being connected using the mounting points 44a, 44b.

Although the safety connector 2 described above allowed linear movement between the first and second members 4, 6, with appropriate modifications to the retention mechanism it could alternatively allow rotational movement of the second member 6 about the first member 4 in both clockwise and anticlockwise directions.

The indentations 20 of the first and second retaining portions 14a, 14b need not be regularly spaced along the inward facing surfaces 18. Where they are not regularly spaced, the head portion 30 may comprise a single protrusion 36 to be received in the indentations 20.

Furthermore, the angles of the forward and rearward facing surfaces 24, 26 of the indentations 20 and the forward and rearward facing surfaces 40, 42 of the protrusions 36 may be selected so as to define the threshold force required to overcome the biasing force.

Although the safety connector 2 has been described as connecting ancillary equipment to a fan case, it could be used for various other applications. For example, the safety connector 2 may be used to connect other elements of a gas turbine engine to one another where it is desired to isolate each component from movement of the other component.

Furthermore, the invention may be used to provide a resettable crumple zone for an automobile. For example, a plurality of safety connectors 2 may be used to connect a bumper of an automobile to its chassis. In the event of a collision, the first and second members 4, 6 of the safety bracket would be displaced relative to one another whilst absorbing energy and thereby limiting damage to the main chassis. After the incident the safety connector could be reset by returning the first and second members 4, 6 to their original positions.

The invention may also be employed as a lifting failsafe device. Here, the safety connector 2 is incorporated into a lift system by being placed between the hook and the hoist. The predetermined threshold force for the safety connector 2 may be designed to be equal to the Safe working Load (SWL) of the lifting system. Accordingly, should the SWL of the lifting system be exceeded then the first and second members 4, 6 will displace relative to one another extending the safety connector 2. This extension may provide a visual indication of an overload condition. In addition, the extension of the safety connector 2 may trigger an alarm system. For example, the displacement stops 12a, 12b may be connected to an alarm circuit which is completed through contact with the end surface 38 or the shoulders 32 of the head portion 30.

The invention claimed is:

1. A safety connector comprising:
   a first member and a second member movably coupled to one another;
   wherein the first and/or second-members comprises a retention mechanism;
   wherein the retention mechanism has a first configuration which prevents relative movement between the first and second members and a second configuration which allows relative movement between the first and second members; and
   wherein the retention mechanism changes from the first configuration to the second configuration when a force between the first and second members exceeds a predetermined threshold force;
   wherein the retention mechanism comprises a biasing arrangement which biases a part of the retention mechanism towards the first configuration, the biasing arrangement comprising a plurality of beam-springs, and
   wherein the retention mechanism comprises a plurality of indentations and the second member comprises a plurality of protrusions, which interlock with one another in the first configuration when the second member is inserted into the first member, wherein the plurality of protrusions of the second member do not move transversely relative to the axial direction, each of the indentations being defined by a forward facing surface and a rearward facing surface, each of the protrusions being defined by a forward facing surface and a rearward facing surface; and wherein each of the protrusions interlock with a corresponding one of the indentations, with the forward facing surfaces of the protrusions contacting the rearward facing surfaces of the indentations, and the rearward facing surfaces of the protrusions contacting the forward facing surfaces of the indentations.

2. A safety connector as claimed in claim 1, wherein the first and second members are translatably coupled to one another.

3. A safety connector as claimed in claim 2, wherein the first and second members are coupled so as to allow movement in two directions.

4. A safety connector as claimed in claim 1, wherein the first and second members are rotatably coupled to another.

5. A safety connector as claimed in claim 1, wherein the first member comprises a body portion having a cavity therein for receiving the second member.

6. A safety connector as claimed in claim 1, wherein the retention mechanism is operable to dampen movement between the first and second members.

7. A safety connector as claimed in claim 1, wherein the or each indentation and protrusion has a pair of surfaces which define the indentation or protrusion, and wherein the angle of these surfaces is selected to determine the predetermined threshold force.

8. A safety connector as claimed in claim 1, wherein the first and/or second members comprise one or more displacement stops which limit the range of movement of the first and second members.

9. A safety connector comprising:
   a first member and a second member movably coupled to one another;
   wherein the first member comprises a retention mechanism;
   wherein the retention mechanism has a first configuration which prevents relative movement between the first and second members and a second configuration which allows relative movement between the first and second members; and
   wherein the retention mechanism changes from the first configuration to the second configuration when a force between the first and second members exceeds a predetermined threshold force;
   wherein the retention mechanism comprises a biasing arrangement which biases a part of the retention mechanism towards the first configuration, the biasing arrangement comprising a plurality of beam-springs, and
   wherein the retention mechanism comprises a plurality of indentations and the second member comprises a plurality of protrusions, which interlock with one another in the first configuration, wherein the retention member is non-pivoting such that all of the protrusions engage and release corresponding ones of the indentations at the same time, each of the indentations being defined by a forward facing surface and a rearward facing surface, each of the protrusions being defined by a forward facing surface and a rearward facing surface; and wherein each of the protrusions interlock with a corresponding one of the indentations, with the forward facing surfaces of the protrusions contacting the rearward facing surfaces of the indentations, and the rearward facing surfaces of the protrusions contacting the forward facing surfaces of the indentations.

* * * * *